US006654827B2

(12) United States Patent
Zhang et al.

(10) Patent No.: US 6,654,827 B2
(45) Date of Patent: Nov. 25, 2003

(54) PORTABLE COMPUTER SYSTEM WITH AN OPERATING SYSTEM-INDEPENDENT DIGITAL DATA PLAYER

(75) Inventors: Tim L. Zhang, Spring, TX (US); Pablo J. Salazar, Spring, TX (US); J. Luke Mondshine, Cypress, TX (US); Eric M. Kilponen, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 427 days.

(21) Appl. No.: 09/752,039

(22) Filed: Dec. 29, 2000

(65) Prior Publication Data

US 2002/0085835 A1 Jul. 4, 2002

(51) Int. Cl.$^7$ .......................... G06F 13/10; G06F 13/12
(52) U.S. Cl. ................. 710/62; 710/8; 710/10; 710/13; 710/14; 710/72; 710/74
(58) Field of Search ................. 710/8, 10, 13, 710/62, 72, 74, 14

(56) References Cited

U.S. PATENT DOCUMENTS

| | | | |
|---|---|---|---|
| 4,821,260 A | 4/1989 | Klank et al. | |
| 4,942,607 A | 7/1990 | Schroder et al. | |
| 5,132,992 A | 7/1992 | Yurt et al. | |
| 5,321,729 A | 6/1994 | Schroder et al. | |
| 5,384,811 A | 1/1995 | Dickopp et al. | |
| 5,455,833 A | 10/1995 | Herre et al. | |
| 5,519,435 A * | 5/1996 | Anderson | 725/92 |
| 5,557,538 A | 9/1996 | Retter et al. | |

(List continued on next page.)

FOREIGN PATENT DOCUMENTS

JP 409101848 A 4/1997

OTHER PUBLICATIONS

Microsoft® Windows Technologies Music Web Page http://www.microsoft.com/windows/windowsmedia/en/music/default.asp, last updated Jul. 13, 2000, p. 1–2.
Douglas Boling, Flux: Digital Audio, a Fact of Life, Microsoft Internet Developer, Jul. 1999, http://msdn.microsoft.com/library/periodic/period99/flux0799.htm, p. 1–2.
"Sonic Foundry and Microsoft Provide First Music Jukebox Based Solely on Windows Media Audio," http://www.microsoft.com/PressPass/press/1999/Aug99/AonicFMSpr.asp, ©2000 Microsoft Corporation, p. 1–3.
ESS Technology, Inc., ES1946 PCI AudoDrive® Notebook Solution Product Brief,© 1999, p. 1–4.
ESS Technology, Inc., Maestro—2™ PCI Audio Accelerator Product Brief, May 1997, p. 1–4.

(List continued on next page.)

Primary Examiner—Rehana Perveen (57) ABSTRACT

A portable computer system provides an operating system-independent digital data player. The computer system includes an operating system, a data storage medium to store a plurality of digitally encoded data files, and a digital data player to decode and play the plurality of digitally encoded data files in an operating system-independent digital data mode. The data storage medium may be any of the storage media for the computer system such as a hard disk drive, a CD-ROM drive, a DVD drive or removable data storage. A mini-display panel of the portable computer system displays control status information associated with playing of the plurality of digitally encoded data files in the digital data mode. The computer system further includes a digital data button to place the portable computer system in the digital data mode and a plurality of digital data control buttons to select a plurality of digital data control commands for the plurality of digitally encoded data files. Selective portions of the portable computer system are placed in a reduced power state for the digital data mode.

44 Claims, 7 Drawing Sheets

U.S. PATENT DOCUMENTS

| | | | |
|---|---|---|---|
| 5,559,834 A | | 9/1996 | Edler |
| 5,560,024 A | | 9/1996 | Harper et al. |
| 5,579,430 A | | 11/1996 | Grill et al. |
| 5,633,843 A | * | 5/1997 | Gupta et al. ............... 711/4 |
| 5,649,029 A | | 7/1997 | Galbi |
| 5,701,346 A | | 12/1997 | Herre et al. |
| 5,703,999 A | | 12/1997 | Herre et al. |
| 5,706,309 A | | 1/1998 | Eberlein et al. |
| 5,736,943 A | | 4/1998 | Herre et al. |
| 5,742,735 A | | 4/1998 | Eberlein et al. |
| 5,768,164 A | | 6/1998 | Hollon, Jr. |
| 5,793,980 A | | 8/1998 | Glaser et al. |
| 5,815,679 A | | 9/1998 | Liu |
| 5,822,598 A | * | 10/1998 | Lam ..................... 713/324 |
| 5,835,375 A | | 11/1998 | Kitamura |
| 5,838,983 A | | 11/1998 | Atkinson |
| 5,890,124 A | | 3/1999 | Galbi |
| 5,917,782 A | * | 6/1999 | Kim et al. ............ 369/30.23 |
| 6,006,285 A | | 12/1999 | Jacobs et al. |
| 6,029,126 A | | 2/2000 | Malvar |
| 6,336,149 B1 | * | 1/2002 | Preston .................... 710/1 |
| 6,401,183 B1 | * | 6/2002 | Rafizadeh ............... 711/173 |
| 6,518,979 B1 | * | 2/2003 | Spertus et al. ............ 345/762 |
| 6,598,172 B1 | * | 7/2003 | VanDeusen et al. ....... 713/503 |

OTHER PUBLICATIONS

ESS Technology, Inc., *ES3209 Video CD Companion Chip Product Brief*, ©2000, p. 104.

Asian Sources Electronics Engineer, *PortalPlayer digital media platform enables direct recording of CD content in MP3 format*, posted Jun. 5, 2000, ©1999, 2000, Trade Media Ltd., p. 1–2.

Asian Sources Electronics Engineer, *We're being surrounded by DSP?*, posted Dec. 1, 1998, ©1999, 2000 Trade Media Ltd., p. 1–4.

Cliff Sanchez et al., *Overview of Digital Audio Interface Data Structures*, AN22REV2, Feb. 1998, © Cirrus Logic, Inc., 1998, p. 1–8.

Cirrus Logic News Releases, *Cirrus Logic Industry's First Audio DSP Chip for "Universal" DVD Players*, http://www.cirrus.com/press/news/index.efm?NewsID=91, May 18, 1999, ©2000 Cirrus Logic, p. 1–3.

Cirrus Logic, CS49300 *Preliminary Production Information, Multi–Standard Audio Decoder Family*, Nov. 1999, DS3390pp1, © Cirrus Logic, Inc., 1999, p. 1–2 & p. 20–22.

*CS4630: Crystal Clear™ Soundfusion® PCI Audio Accelerator*," http://www.cirrus.com/design/products/overview/index.cfm?ProductID=42, © 2000 Cirrus Logic, p. 1–2.

*CS4281: CrystalClear™ PCI Audio Interface*, http://www.cirrus.com/design/products/overview/index.cfm?ProductID—20, © 2000 Cirrus Logic, p. 1–2.

*CS4299: CrystalClear™ Soundfusion® Audio Codec '97*, http://www.cirus.com/design/products/overview/index.cfm?ProductID=25, © 2000 Cirrus Logic, p. 1–2.

*CS4235: CrystalClear™ Low Cost ISA Audio System*, http://www.cirrus.com/design/products/overview/index.cfm?ProductID=14, © 2000 Cirrus Logic, p. 1–2.

ESS Technology, Inc., *ES3210 Video CD Processor Chip Product Brief*, SAM0128–071597. p. 1–2.

Intel® *Pentium™ Processor User's Manual, Vol. 3: Architecture and Programming Manual*, © Intel Corporation 1994, Chapter 20, System Management Mode, p. 20-1–20-9.

Margaret Quan, *Internet audio takes center stage at CES*, EETIMES.COM, http://www.eet.com/story/OEG20000107S0046, Jan. 11, 2000, © 2000 CMP Media Inc., p. 1–5.

Oh Hong Lye, *Anatomy of a multi–format digital audio player*, Multimedia Technology, $MP_3$ AUDIO, Electronics Engineer, Apr. 2000, p. 1–4.

Asian Sources Electronics Engineer, *Digital audio dominates multimedia trends*, Posted Dec. 1, 1999, © 2000 Trade Media Ltd., p. 1–4.

Jason Kridner et al., *A DSP Powered Solid State Audio System*, Texas Instruments Incorporated, p. 1–4.

$O_2$Micro Breathing Life into Mobility OZ165 AudioDJ®, Sep. 24, 1999, ©1999 by $O_2$Micro, OZ165–DS–1.1, p. 1–34 and 7 pages of attachments.

Erich Luening, *Thomson plans portable digital music player*, CNET.com—News—Personal Technology, May 3, 1999, p. 1–2.

Paul Festa et al., *RealNetworks launches Jukebox*, CNET.com—News—Entertainment & Media, May 3, 1999, p. 1–2.

Peter Clark, EE Times, Jul. 21, 2000, *Internet audio platform delivers $5 MP3 chip*, http://www.edtn.com/story/prod/OEG20000721–T, © 2000 CMP Media Inc., p. 1–3.

Richard Shim, ZDNet News, Updated May 3, 2000, *Digital music awaits new wave of Rios*, http://www.zdnet.com/zdnn/stories/news/0,4586,2560863,00.html, © 2000 ZD Inc., p. 1–4.

EBN Staff, Electronic Buyers' News, May 02, 2000, *S3 to drive Rio MP3 audio player into home, car*, http://www.edtn.com/story/prod/OEG200005020022–R, ©2000 CMP Media Inc., p. 1–2.

Rio Home Web Page http://www.riohome.com/pg00003.htm, *Rio Receiver*, p. 1.

CNN.com—Technology, May 1, 2000, *Move MP2 to your home stero*, http://www.cnn.com/2000/TECH/computing/05/01/mp3.stereo.idg/index.html, © Cable News Network, p. 1–3.

*empeg car, the future of car audio has arrived*, http://www.empeg.com/products/product_car.html;http://www.empeg.com/products/product$_{13}$ car_specs.html;http://www.empeg.com/products/product_car_player.html; http://www.empeg.com/products/product_car_download. html; and http://www.empeg.com/products/index.html, 6 pages.

* cited by examiner

PORTABLE COMPUTER SYSTEM WITH AN OPERATING SYSTEM-INDEPENDENT DIGITAL DATA PLAYER

BACKGROUND OF THE INVENTION

1. Field of the Invention

The present invention generally relates to digital data playing capabilities of portable computer systems and more particularly to a portable computer system with an operating system-independent digital data player.

2. Description of the Related Art

With the recent explosive growth in digital audio playing, standalone or portable digital audio players have largely become mainstream consumer devices. Computer systems, however, are not especially positioned to benefit from the digital audio revolution given the nature of digital audio playing for computer systems. PC-based digital audio players are software applications that must operate with an operating system. For a PC-based digital audio player, an operating system is necessary to provide high-level functionality to perform tasks such as retrieving digital audio files. One drawback of the need for an operating system to play digital audio files with a computer system is the significant amount of time associated with loading an operating system. This period of delay before digital audio playing is undesirable since users with standalone digital audio players are not accustomed to such a delay. Another drawback is the power consumption associated with components in the computer system which are normally powered when an operating system is running. A PC-based digital audio player has required that a main processor be running and that practically the entire computer system be powered. Because of such power consumption issues, the amount of time for which digital audio files may be played in a portable computer powered only by a battery is significantly less than the play time users are accustomed to with standalone digital audio players. Essentially, any PC-like system with an operating system and digital audio playing capabilities has been subject to these sort of drawbacks. PC-based digital audio players thus have been unsuited to playing digital audio files as quickly, as easily or as long as allowed by standalone digital audio players. Further, PC-based digital video players have similar drawbacks.

SUMMARY OF THE INVENTION

Briefly, a portable computer system provides an operating system-independent digital data player. The computer system includes an operating system, a data storage medium to store a plurality of digitally encoded data files, and a digital data player to decode and play the plurality of digitally encoded data files in an operating system-independent digital data mode. The data storage medium may be any of the storage media for the computer system such as a hard disk drive, a CD-ROM drive, a DVD drive or removable data storage. The operating system-independent digital data player enables portable computer users to more quickly and easily play digital data files and to increase digital data playing time.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

The following commonly-assigned patents are incorporated herein by reference in their entirety for all purposes:

U.S. Pat. No. 6,006,285, entitled "COMPUTER SYSTEM CAPABLE OF PLAYING AUDIO CDS IN A CD-ROM DRIVE INDEPENDENT OF AN OPERATING SYSTEM," granted Dec. 21, 1999; and U.S. Pat. No. 5,838,983, entitled "PORTABLE COMPUTER WITH LOW POWER AUDIO CD-PLAYER," granted Nov. 17, 1998.

Figure 1:
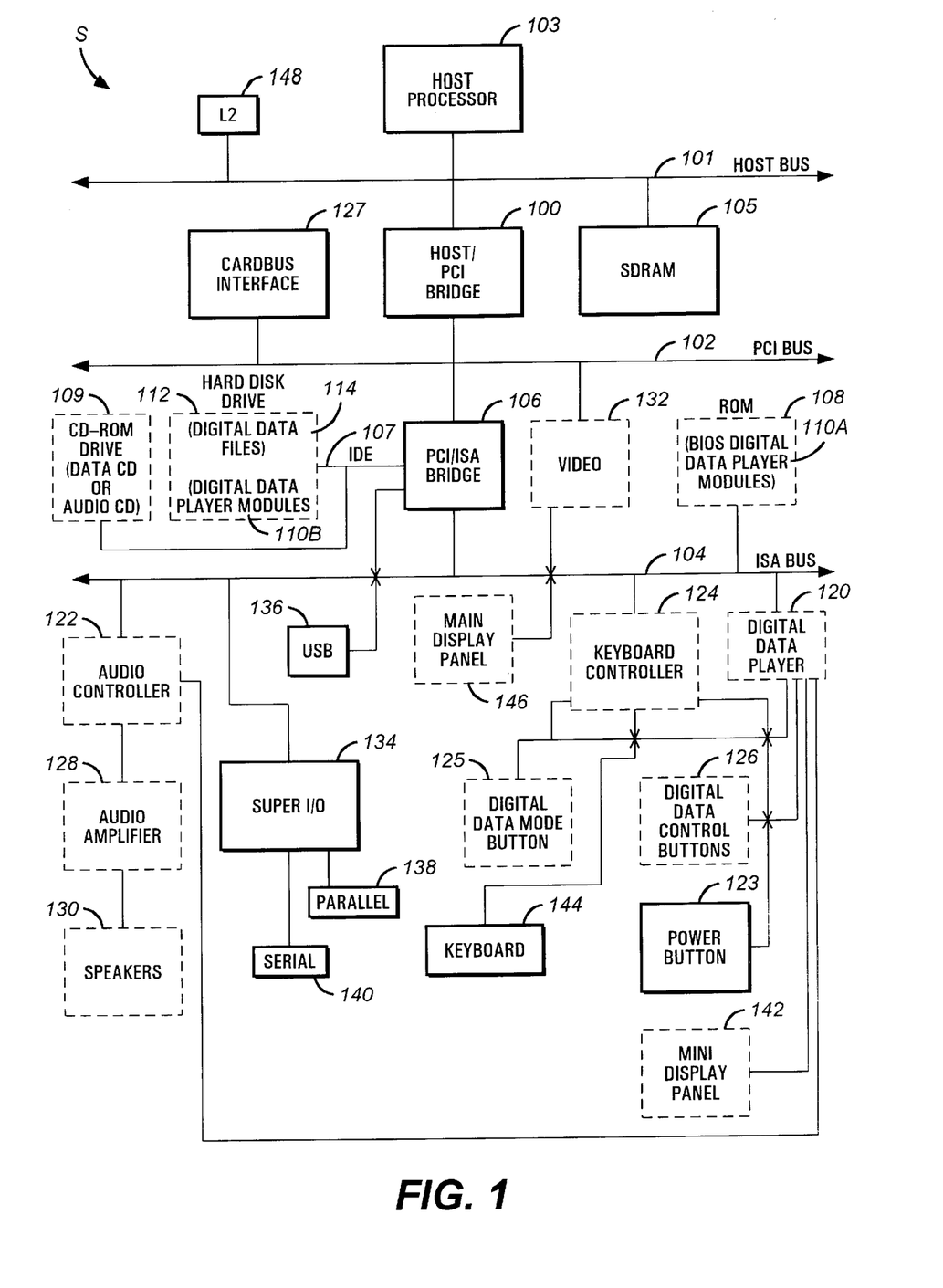
FIG. 1 is a block diagram of an illustrative portable computer system adapted for an operating system-independent digital data player.

Turning now to the drawings, FIG. 1 shows an exemplary architecture of a portable computer system S adapted for operating system-independent digital data or media playing. The portable computer system S includes a host bus 101 coupled upstream to a host processor 103 and a L2 cache 148 and coupled downstream to a synchronous dynamic random access memory (SDRAM) 105 and a host/PCI (Peripheral Component Interconnect) bridge 100. The host/PCI bridge 100 bridges the host bus 101 to a PCI bus 102 that is connected to a video controller 132, a CardBus or other PCMCIA (Personal Computer Memory Card International Association) interface 127 and a PCI/ISA (Industry Standard Architecture) bridge 106. An IDE (Integrated Drive Electronics) bus 107 connected to the PCI/ISA bridge 106 is coupled to a CD-ROM drive 109 and a hard disk drive 112. Coupled downstream of the PCI/ISA bridge 106 is an ISA bus 104 coupled to an audio controller 122, a Basic Input/Output System (BIOS) read only memory (ROM) 108 containing system BIOS, a keyboard controller 124 and a Super I/O controller 134. The audio controller 122, which typically includes an audio coder/decoder (CODEC), is coupled to an audio amplifier 128 that provides audio signals to speakers 130. The keyboard controller 124 controls a keyboard 144, and the Super I/O controller 134 controls a variety of ports such as a parallel port 138 and an asynchronous serial port 140. A main display panel 146 is coupled to the video controller 132, and a universal serial bus (USB) port 136 is coupled to the PCI/ISA bridge 106. "X" symbols are show in FIG. 1 to indicate where the intersection of two lines does not imply a connection between the lines. While not shown, the system S may also include a digital video disc (DVD) drive and support for a variety of removable media. Certain typical components of a portable computer system are not shown for sake of clarity. Further, it should be understood that the illustrated computer system architecture is exemplary as (1) certain components may be located off different busses, (2) certain components may be integrated, (3) certain components may be eliminated and/or (4) certain components may be coupled to a different set of components, as well as other architectural variations which will be readily appreciated by those of ordinary skill in the art.

For ease of illustration, certain components which can play a role in supporting operating system-independent digital data playing for the illustrated portable computer system S are shown in dashed line. These components include the hard disk drive 112, the CD-ROM drive 109, the BIOS ROM 108, the keyboard controller 124, the audio controller 122, the audio amplifier 128, the speakers 130, the video controller 132, the main display panel 146, a digital data player 120, a digital data mode button 125, digital data player control buttons 126 and a mini display panel 122. The video controller 132 and the main display panel 146 may be used if the digital data playing is digital video playing. The illustrated components are not exhaustive of components which may accommodate operating system-independent data playing since removable storage media, for example, are not shown.

In a disclosed embodiment, the mini display panel 122 is a liquid crystal display (LCD) panel provided on a case or housing of the portable computer system S. An example of a mini display panel is described in connection with operating system-independent audio CD playing in the commonly-assigned U.S. Pat. No. 6,006,285, entitled "COMPUTER CAPABLE OF PLAYING AUDIO CDS IN A CD-ROM DRIVE INDEPENDENT OF AN OPERATING SYSTEM," previously incorporated herein by reference. For the illustrated portable computer system S, the mini display panel 122 serves as a status display panel by displaying control status information associated with playing of the digital data files 114 in an operating system-independent digital data mode of the portable computer system S.

The hard disk drive 112 can be used to store both digital data files 114 (also termed a playlist) and select digital data player software modules 110B. Other digital data player software/firmware modules 110A can be stored in the BIOS ROM 108. As an alternative to the digital data player software modules 110A and 110B, the portable computer system S can provide the digital data player 120. While the digital data player software modules 110A and 110B together represent a software-implemented digital data player, the digital data player 120 represents a hardware-implemented digital data player. Depending on the voltage of devices off the ISA bus 104, voltage translation buffers may be employed if the digital data player 120 is coupled to the ISA bus 104. As shown, the CD-ROM drive 109 can house a data CD containing the digital data files 114 or can house an audio CD. Thus, the digital data files 114 can be stored on the hard disk drive 112, on a data CD in the CD-ROM drive 109 or on a DVD CD in a DVD drive. The digital data files 114 can also be stored on any form of removable data storage. Operating system-independent digital data playing thus may function or accommodate a variety of independent non-volatile storage media for the digital data files 114.

The digital data mode button 125 places the portable computer system S in the operating system-independent digital data mode to play the digital data files 114. In this mode, a user can press the digital data control buttons 126 to select digital data control commands associated with playing the digital data files 114. The keyboard controller 124 can detect user selection or actuation of the digital data mode button 125 and the digital data control buttons 126. Alternatively, the digital data player 120 can detect user selection or activation of the digital data mode button 125 and the digital data control buttons 126. The keyboard controller 124 also monitors or detects user selection or actuation of a main power button 123 since the main power button 123 is maintained in an off state for the operating system-independent digital data mode. Actuation of the main power button 123 in the digital data mode triggers exiting of the digital data mode and powering up of the portable computer system S in the normal manner. The involvement of these particular components in operating system-independent digital audio playing for the portable computer system S is described in more detail below. It should be understood that these components are not exhaustive of the components that can support operating-system independent digital data playing for the portable computer system S and that certain components can be omitted. One advantage of an operating system-independent digital data player of a portable computer system is enabling portable computer users to more quickly and easily play digital data files.

Figure 2:
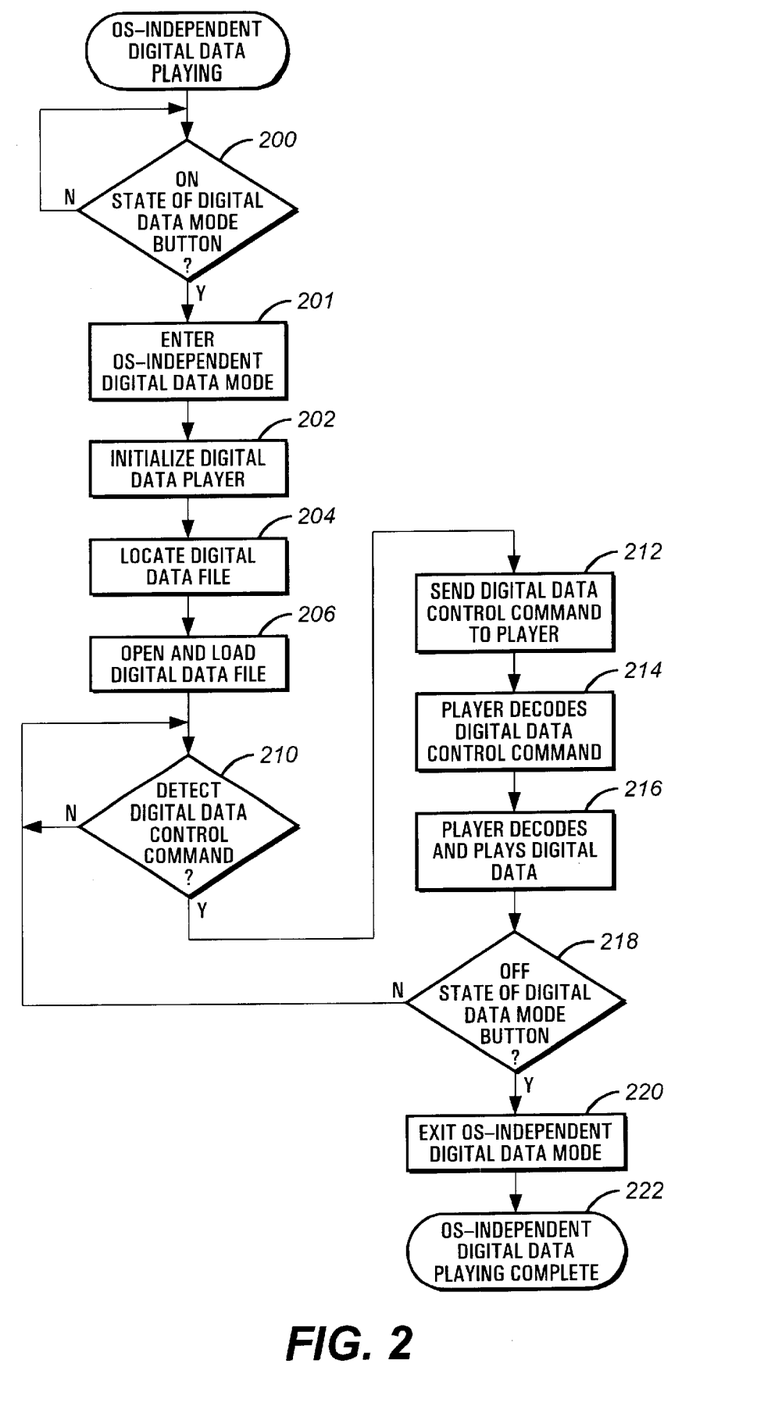
FIG. 2 is a flow chart of an illustrative digital data playing process in connection with the operating system-independent digital data player of FIG. 1.

Referring to FIG. 2, an exemplary operating system-independent digital data playing process for the portable computer system S is shown. Beginning in step 200, it is determined if the digital data mode button 125 has been placed in an on state. The digital data mode button 125 is preferably selected when the portable computer system S is in a reduced power state such as a soft-off state or a hibernation state. If the digital data mode button 125 is in an on state, in step 201, the portable computer system S enters the operating system-independent digital data mode. In the digital data mode, the digital data player operates independently of the operating system. Next, in step 202, the digital data player (digital data player software modules 110A and 110B or digital data player 120) is initialized. This step can also involve initializing certain portions of the portable computer system S. For example, in a disclosed embodiment, the hard disk drive 112 and the CD-ROM drive 109 are powered; the audio controller 122 and the keyboard controller 124 are initialized; and the host processor 103 is placed in a reduced power mode. A reduced power mode should be understood to encompass low power or speed states including an off power or speed state. Any portion of the portable computer system S that is not needed for the digital data mode is placed in a reduced power mode that is preferably the most optimized power saving state. Two advantages of placing selective portions of the portable computer system S in a reduced power state for an operating system-independent digital data mode are minimizing system power consumption and significantly extending digital data play time. In the operating system-independent digital data mode, the operating system of the portable computer system S is not loaded.

From step 202, control proceeds to step 204 where a digital data file 114 (e.g., a digital audio file or a digital video file) is located or retrieved. The digital data file 114 can be located on the hard disk drive 112, the CD-ROM drive 109, a DVD drive or any form of removable data storage such as a PC Card, Compact Flash, Memory Stick™ and the like. Alternatively, the digital data file 114 can be downloaded from the Internet, obtained from an email or acquired by any other way of transmitting digital data to a portable computer system. Next, in step 206, the digital data file 114 is opened and loaded or read from the hard disk drive 112 or other applicable data storage medium to the SDRAM 105 (main memory). The hard disk drive 112 should be used economically whereby the motor of the hard disk drive 112 is only spun if raw digital data is being retrieved.

From step 206, control passes to step 210 where it is determined if a digital data control command is detected. A digital data control command can for example be selected by any of the following exemplary digital data control buttons 126: a play/pause button, a fast forward/next track button, a rewind/previous track button, a volume up button, a volume down button and a stop button. These control buttons 126 are similar in operation to the CD buttons described in the commonly-assigned U.S. Pat. No. 6,006,285, entitled "COMPUTER CAPABLE OF PLAYING OF AUDIO CDS IN A CD-ROM DRIVE INDEPENDENT OF AN OPERATING SYSTEM," previously incorporated herein by reference. Pressing the volume up button and the volume down button simultaneously mutes the sound in the digital data mode. The keyboard controller 124 or the digital data player 120 can detect selection of a digital data control command. If a digital data control command is detected in step 210, then in step 212 the command is provided to the digital data player. In step 214, the digital data player decodes the digital data control command. Next, in step 216 the digital data player decodes the digital data file 114. For example, if the command is a play command, then the digital data player decodes and plays digital data from the digital data file 114. Techniques for decoding digital data are well known to those of ordinary skill in the art. Playing of the digital data should be understood to encompass any functions associated with playing digital data (e.g., next track, previous track, stop and pause). In step 218, it is determined if the digital data mode button 125 has been placed in an off state. If so, then the operating system-independent digital data mode is exited in step 220. When the digital data mode button 125 is placed in an off state, a soft-off command may be used to shutdown power to the portable computer system S. From step 220, operating system-independent digital data playing is completed in step 222. If the digital data mode button 125 has not been placed in an off state, then control returns to step 210 where another digital data command can be detected. It should be understood that the illustrated steps can be performed in a different order than that shown.

Figure 3:
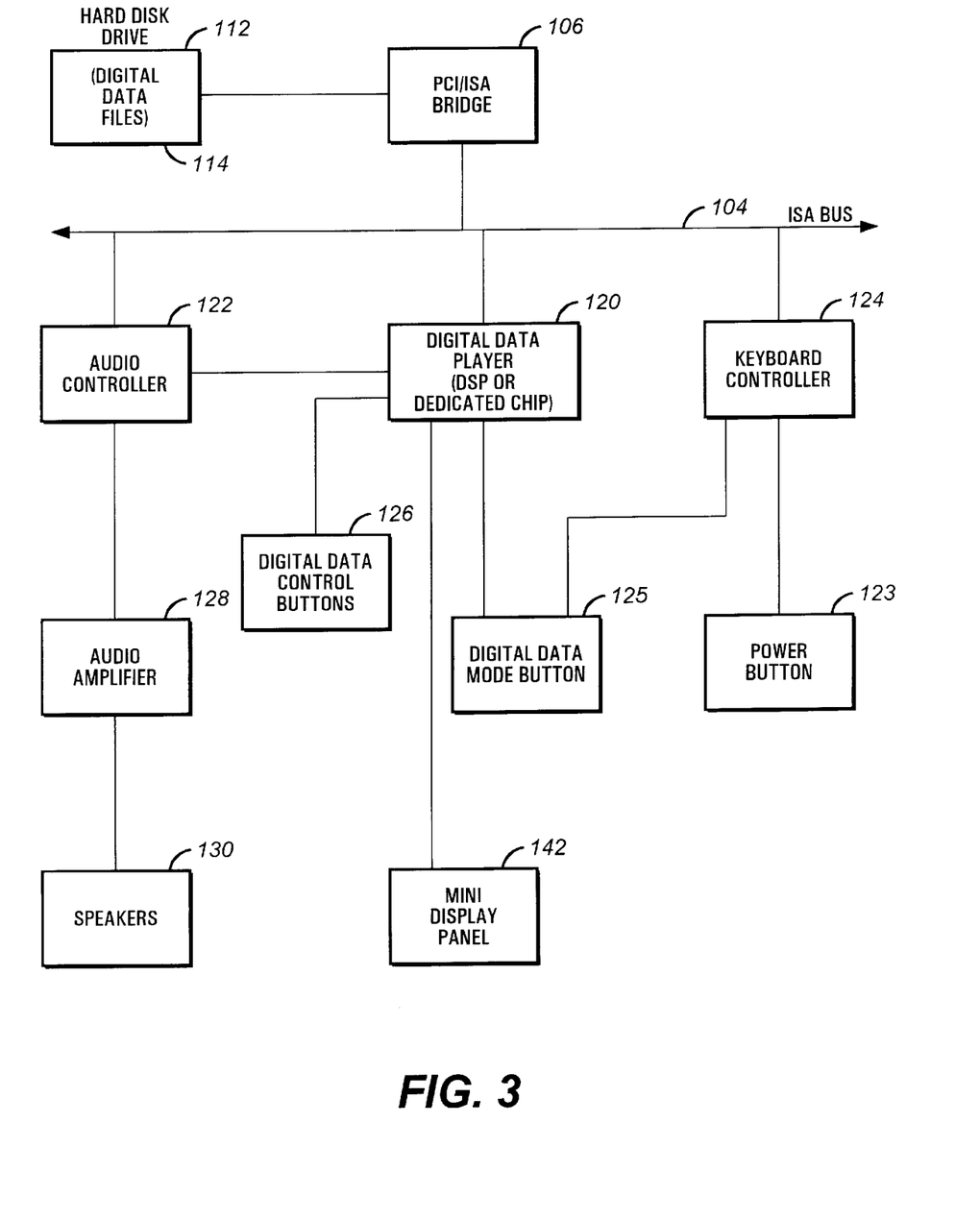
FIG. 3 is a block diagram of illustrative components of the portable computer system of FIG. 1 for a hardware-implemented, operating system-independent digital data player.

Referring to FIG. 3, illustrative components of the portable computer system S for a hardware-implemented operating system-independent digital data player are shown. Like in FIG. 1, the digital data player 120 is shown coupled to the digital data control buttons 126, the digital data mode button 125, the mini display panel 142 and the audio controller 122. Also, as shown in FIG. 1, the keyboard controller 124 is coupled to the digital data mode button 125 and the power button 123. In the illustrated embodiment, the digital data player 120 is dedicated digital player circuitry or a general-purpose digital signal processor. The digital data player 120 provides digital audio information to the audio controller 122. The audio controller 122 converts the digital audio information to analog form. The analog audio signals are passed from the audio controller 122 to the audio amplifier 128 which amplifies the signals for the speakers 130. It should be understood that the architecture of the portable computer system S relevant to operating system-independent digital data playing will to some extent depend upon the nature of the digital data files 114. For example, if the digital data files 114 are digital video files, the video controller 132 and the main display panel 146 may be involved in addition to the components of FIG. 3.

Figure 4A:
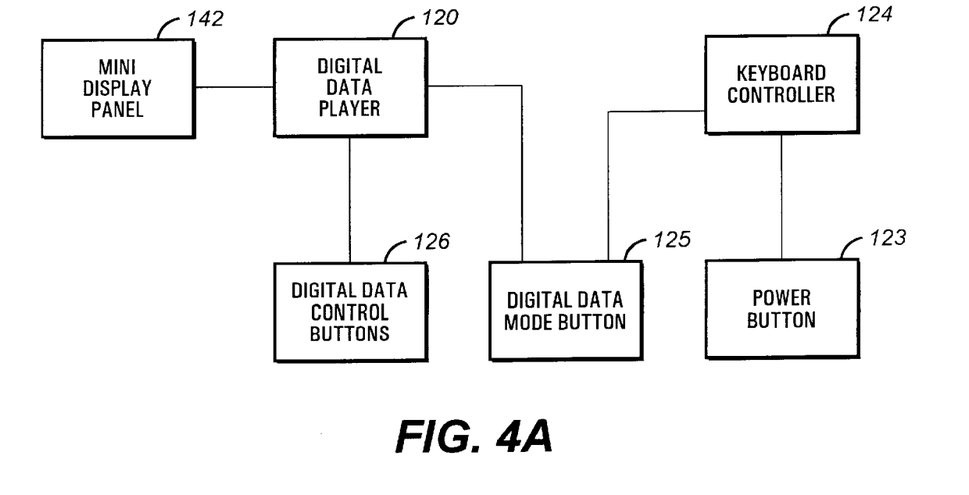
FIGS. 4A and 4B are block diagrams of two illustrative hardware-based embodiments involving the digital data player and the keyboard controller of FIG. 3.
Figure 4B:
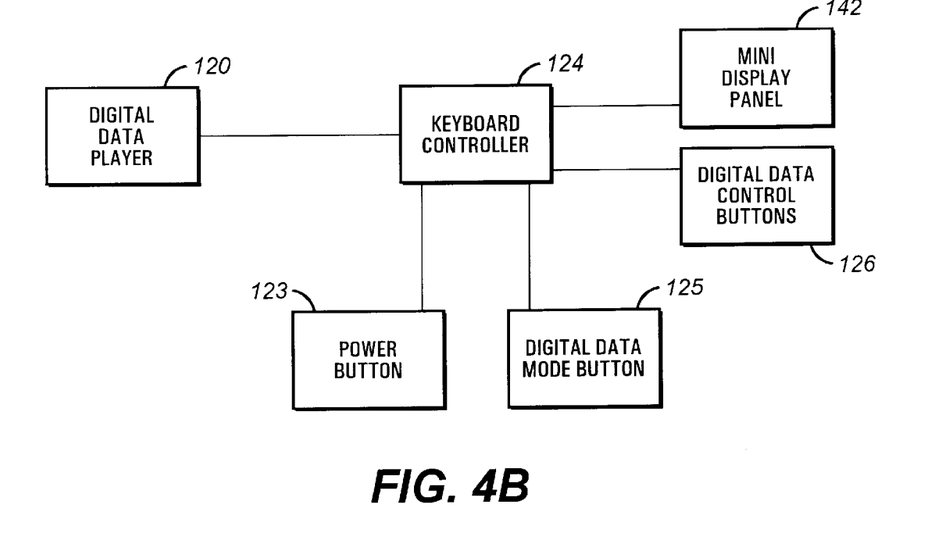

FIGS. 4A and 4B illustrate uses of the keyboard controller 124 and the digital data player 120 for two embodiments of a hardware-implemented operating system-independent digital data player. In FIG. 4A, the digital data player 120 detects signals from the digital data mode button 125 and the digital data control buttons 126 and provides signals to the mini display panel 142. In contrast in FIG. 4B, the keyboard controller 124 detects signals from the digital data mode button 125 and the digital data control buttons 126 and provides signals to the mini display panel 142. The keyboard controller 124 may be connected to the digital data player 120 with a serial bus such as an $I^2C$ bus. Compared to the embodiment in FIG. 4A, certain functions are more centralized with the keyboard controller 124 in FIG. 4B. FIGS. 4A and 4B in combination represent that in connection with operating system-independent digital data playing certain functions may be allocated to the keyboard controller 124 or the digital data player 120. As an alternative to providing the keyboard controller 124 distinct from the digital data player 120 as shown in FIGS. 4A and 4B, the keyboard controller 124 and the digital data player 120 may be integrated.

Figure 5:
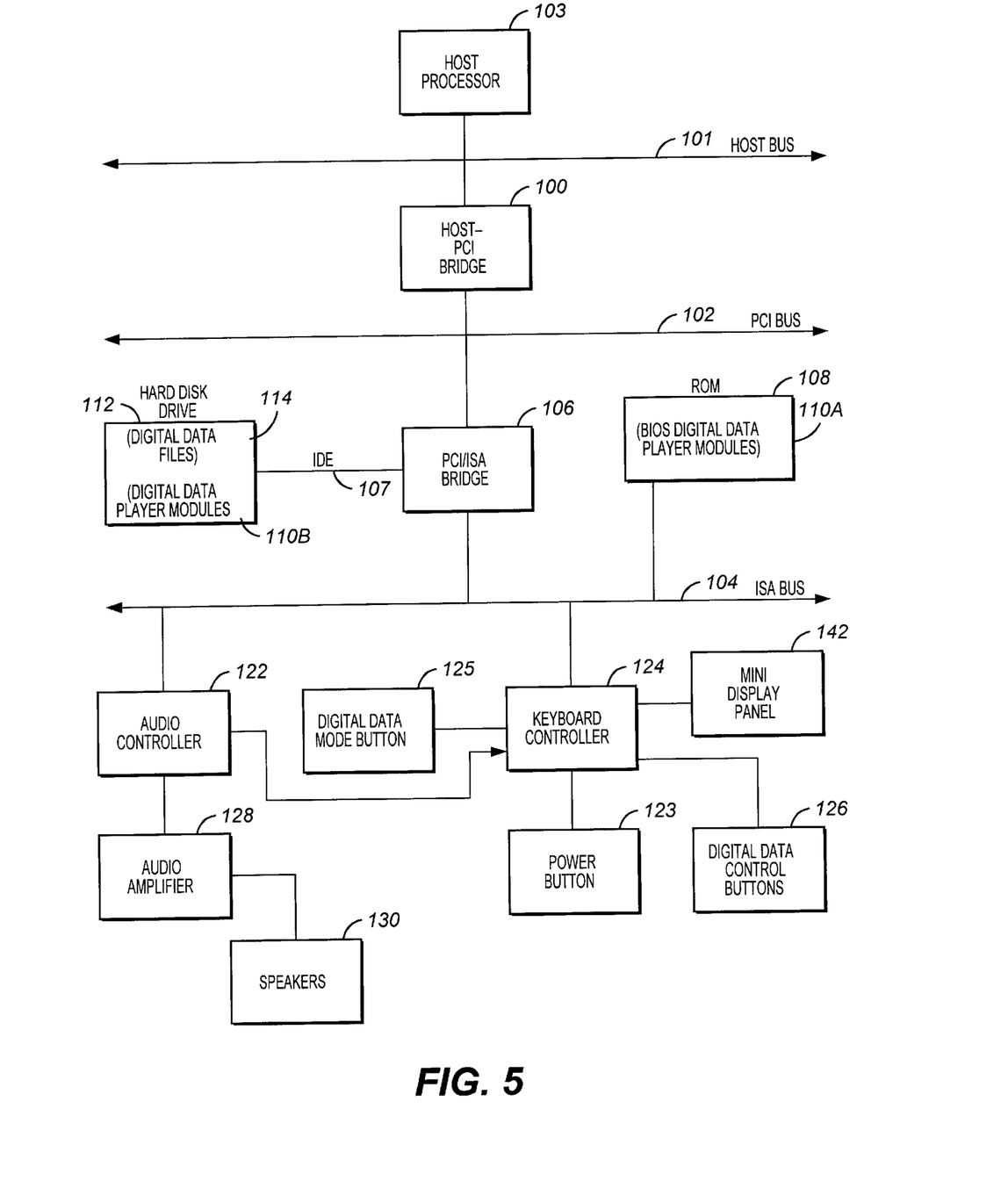
FIG. 5 is a block diagram of illustrative components of the portable computer system of FIG. 1 for a software-implemented, operating system-independent digital data player.

FIG. 5 shows illustrative components of the portable computer system S for a software-implemented operating system-independent digital data player. Like in FIG. 4B, the keyboard controller 124 detects signals from the digital data mode button 125 and the digital data control buttons 126 and provides signals to the mini display panel 142. Instead of providing the hardware-implemented digital data player 120 as shown in FIGS. 4A and 4B, the portable computer system S provides digital data player software modules 110B in the hard disk drive 112 and other digital data player software firmware modules 110B in the BIOS ROM 108. In an alternative embodiment, digital data player functions may be divided between hardware and software or digital data player functions may be handled by storage media other than the hard disk drive 112 and the BIOS ROM 108.

Figure 6:
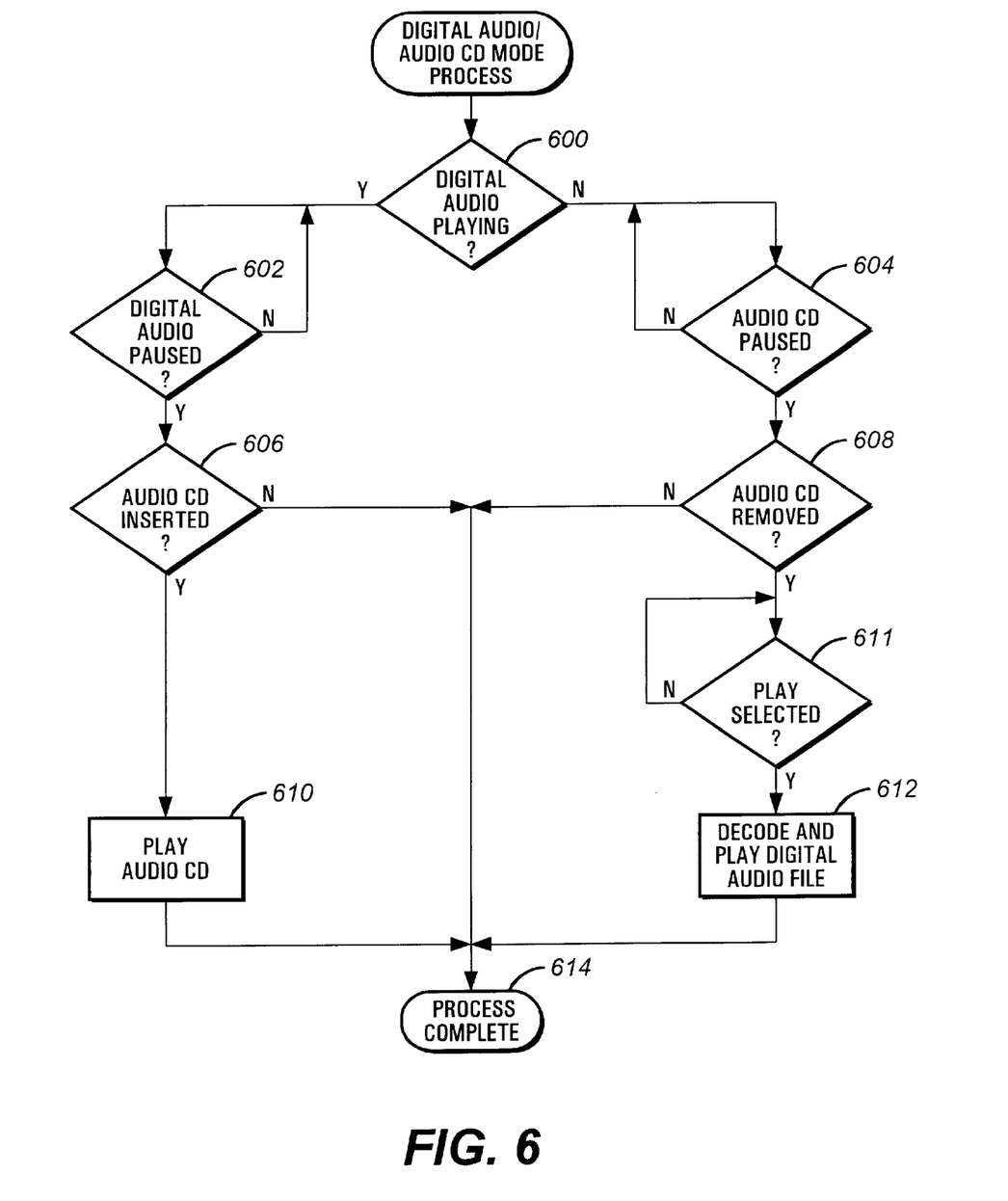
FIG. 6 is a flow chart of an illustrative digital audio/audio CD mode process in connection with an operating system-independent digital audio player.

Referring to FIG. 6, an exemplary digital audio/audio CD mode process in connection with the portable computer system S is shown. The digital audio/audio CD mode is a combined mode in which either a digital audio file or an audio CD is played in an operating system-independent mode. The digital audio portion of the combined mode is similar to the digital data mode described above in connection with FIG. 2. The audio CD portion of the combined mode is similar to the audio CD play mode described in the commonly-assigned U.S. Pat. No. 6,006,285, entitled "COMPUTER SYSTEM CAPABLE OF PLAYING AUDIO CDS IN A CD-ROM DRIVE INDEPENDENT OF AN OPERATING SYSTEM," previously incorporated herein by reference. In the combined mode, the digital data mode button 125 is used to launch operating system-independent digital audio playing or audio CD playing. Beginning in step 600, it is determined if a digital audio file is playing. If not, then control proceeds to step 604 where it is determined if playing of an audio CD is paused. If so, then in step 608 it is determined if an audio CD is removed. If an audio CD has been removed, then control proceeds to step 611 where it is determined if a digital audio/audio CD play button has been selected. If so, then in step 612 a digital audio file is decoded and played. In this way, a user can pause playing of an audio CD and remove the audio CD from the CD-ROM drive, and the portable computer system S recognizes that decoding and playing of a digital audio file is desired. In step 611, if the digital audio/audio CD play button is not selected, control remains in step 611. In step 604, if the playing of an audio CD is not paused, then control remains in step 604. In step 608, if an audio CD is not removed, then the process proceeds to step 614 where the process is completed.

From step 600, if it is determined that a digital audio file is playing, then control proceeds to step 602 to determine if the digital audio playing is paused. If digital audio playing is paused, then in step 606 it is determined if an audio CD has been inserted into the CD-ROM drive. If so, then in step 610 the audio CD is played. In this way, a user can pause playing of a digital audio file and insert an audio CD in the CD-ROM drive 109, and the portable computer system S recognizes that playing an audio CD is desired. Details regarding playing an audio CD in a low power mode can be found in the commonly-assigned U.S. Pat. No. 5,838,983, entitled "PORTABLE COMPUTER WITH LOW POWER AUDIO CD-PLAYER," previously incorporated herein. In step 602, if the digital audio playing is not paused, then control remains in step 602. In step 606, if an audio CD has not been inserted into the CD-ROM drive 109, then control proceeds to step 614 where the process is completed. The same control buttons on the portable computer system S may be used for digital audio playing and audio CD playing. It should be understood that the disclosed process can readily be adapted to support a combined digital audio/audio CD/digital video disc mode for playing digital audio files, audio CDs and digital video files independently of an operating system. Similarly, the disclosed process can readily be adapted to support a combined digital audio/digital video disc mode or a combined audio CD/digital video disc mode. A combined digital audio/digital video disc mode generally shows that digital data files may be decoded and played from a variety of independent storage media depending upon the particular data storage medium where such files are stored. Further, the disclosed process can readily be adapted to support a mode for playing multiple forms of digital audio or video files. In this way, an operating system-independent digital data player may support playing of digital data files with multiple audio or video formats.

Figure 7:
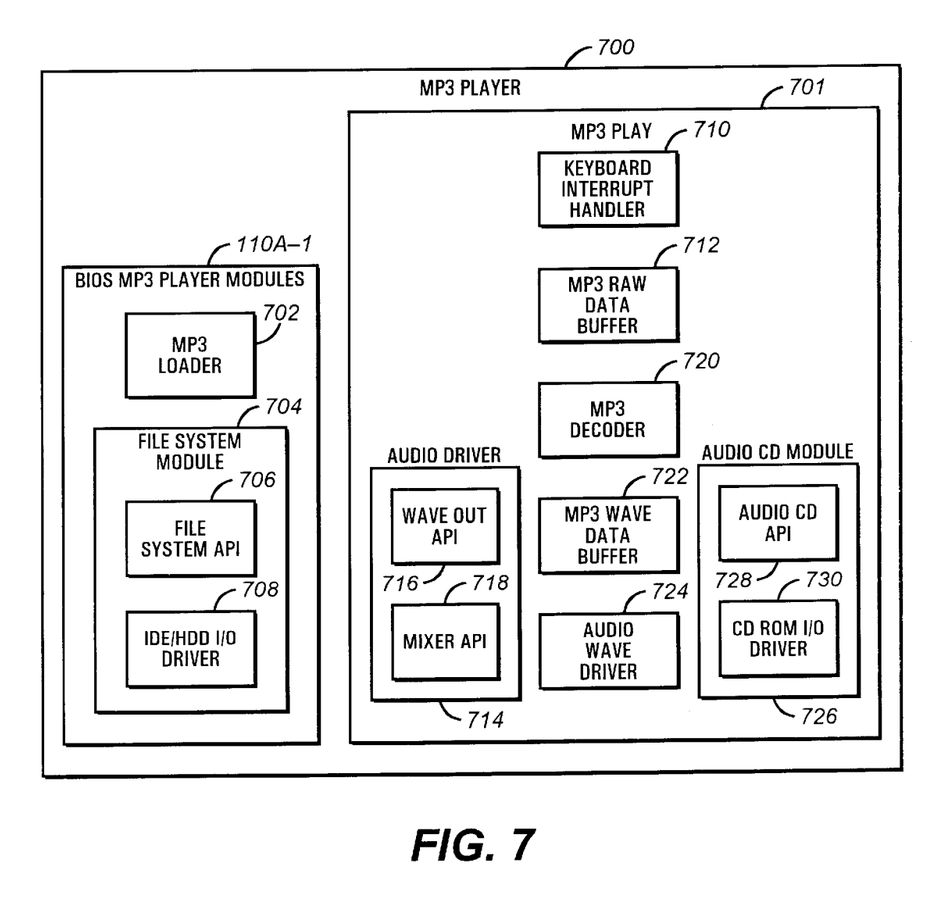
FIG. 7 is a block diagram of an exemplary architecture of an operating system-independent MP3 player.

Referring to FIG. 7, an exemplary architecture of an MP3 player 700 is shown. MP3 is understood to be a common digital audio format. The MP3 player 700, which is an operating system-independent player that plays MP3 files, includes system BIOS MP3 player modules 110A-1 and an MP3 play module 701. The system BIOS MP3 player modules 110-1 represent the portion of the MP3 player stored in the BIOS ROM 108. In a disclosed embodiment, the BIOS ROM 108 is of sufficient size to store the BIOS MP3 player modules 110A-1 in addition to standard BIOS software. These modules 110A-1 include an MP3 loader 702 and a file system module 704. For the operating system-independent MP3 mode of the portable computer system S, the system BIOS transfers control to the MP3 loader 702. In a disclosed embodiment, the MP3 loader 702 initializes any logic of the portable computer system S necessary or useful for an MP3 working environment. For example, the keyboard controller 124, the audio controller 122, and an IDE controller of the hard disk drive 112 can be initialized by the MP3 loader 702. The MP3 loader 702 may also initialize logic or functions such as an interrupt controller, stack and data segment registers, a timer, caches, power management functions and System Management Bus (SMBus) devices. Further, the MP3 loader 702 may initialize software such as an SCI (System Control Interrupt) interrupt handler for ACPI (Advanced Configuration and Power Interface) support and a timer interrupt handler. After the MP3 working environment is initialized, the MP3 loader 702 initializes the file system module 704.

The file system module 704 contains a file system API (Application Programming Interface) 706 and an IDE/HDD I/O driver 708. The file system API 706 implements the appropriate protocol for accessing the hard disk drive 112. The following APIs may be supported by the file system API 706: Search_First, Search_Next, Open_by_FilenamePath, Open_by_Handle, Read_File, Seek_File_Position, and Close_File. These APIs are illustrative and not exhaustive, and their functions are self-explanatory to those of ordinary skill in the art based on the disclosure herein. Access of any MP3 files on the hard disk drive 112 is handled by the file system module 704 without support from the operating system. In a disclosed embodiment, the file system module 704 supports the Microsoft® FAT16 or FAT32 file system. During the initialization of the file system module 704, it is determined whether the hard disk drive 112 is FAT16-compatible or FAT32-compatible. FAT stands for File Allocation Table. It should be understood that alternatively file systems other than FAT16 or FAT32 might be supported. Both the file system module 704 and the MP3 loader 702 are preferably compressed in the BIOS ROM 108 until needed.

The IDE/HDD I/O driver 708, which is linked to the file system module 704, handles IDE/HDD programming. The following functions may be defined for the driver 708: Get_HDD_Parameters, Reset_IDE and Read_Data. These functions as well are self-explanatory to those of ordinary skill in the art based on the disclosure herein. The driver 708 is given control when an IDE interrupt is detected. Included in the driver 708 is an initialization procedure to initialize a hard disk drive interrupt handler and a standby timer of the hard disk drive 112 for automatic HDD motor spin down. The driver 708 may use an IDE DMA (direct memory access) bus master mode for reading data from the hard disk drive 112.

The MP3 loader 702 calls the file system API 706 to load the MP3 play module 701 from the hard disk drive 112 into the SDRAM 105. The MP3 play module 701, which is configured for hidden file attributes and a read only function, is stored in a designated directory path of the hard disk drive 112. By storing the MP3 play module 701 on the hard disk drive 112, BIOS ROM space is conserved. In an alternative embodiment where BIOS ROM space is abundant, the MP3 play module 701 may be stored in the BIOS ROM 108. In that way, the entire MP3 player 700 could be stored in the BIOS ROM 108.

The MP3 play module 701 includes a keyboard interrupt handler 710, an MP3 raw data buffer 712, an MP3 decoder 720, an MP3 wave data buffer 722 and an audio wave driver 724. The keyboard interrupt handler 710 is used to detect MP3 commands associated with playing the MP3 files. The MP3 buttons for selecting MP3 control commands are similar to the digital data control buttons 126 described above. Likewise, the MP3 control commands are similar to the digital data control commands described above. The MP3 raw data buffer 712 is used to store raw data from an MP3 file. The MP3 raw data buffer 712 is polled periodically to determine if loading of data from selected MP3 files should be resumed. The MP3 decoder 720 is used to decode data from an MP3 file. The MP3 decoder 720 is given control when the HDD/IDE I/O driver 708 is awaiting an interrupt or when the MP3 raw data buffer 712 is full. The MP3 wave data buffer 722 is used to store decoded wave data. In a disclosed embodiment, the MP3 wave data buffer 722 and the MP3 raw data buffer 712 use extended memory. The audio wave driver 724 is used to process wave data from the MP3 wave data buffer 722. The MP3 decoder 720 ensures that wave data is played smoothly. The following APIs may be supported by the MP3 decoder 720: Start_To_Decode, Pause_Resume_Decode and Stop_Decode.

These APIs are self-explanatory to those of ordinary skill in the art based on the disclosure herein.

The MP3 play module 701 may further include an audio driver 714 and an audio CD module 726. The audio driver 714 includes a wave out API 716 and a mixer API 718. The wave at API 716 is used to provide wave out data, and the mixer API 118 is used for volume control. The audio driver 714 receives decoded wave data from the MP3 decoder 720. The audio CD module 726 includes an audio CD API 728 and a CD-ROM I/O driver 730. The audio CD module 726 may further include an initialization procedure to identify the CD-ROM drive 109 and to initialize the appropriate interrupt service. The CD-ROM I/O driver 730 provides commands to the CD-ROM drive 109 associated with playing an audio CD in an operating system-independent mode of the portable computer system S. In a disclosed embodiment, the CD-ROM I/O driver 730 is implemented as an ATAPI (AT Attachment Packet Interface) driver. The CD API 782 implements the appropriate protocol for communicating with the CD-ROM drive 109. For example, the CD API 782 may support the following APIs: CD_TestDriveReady to test if a CD is ready in the CD-ROM drive 109, CD_TestIfAudioCD to test if the CD is an audio CD, CD_Eject to eject or close the CD tray of the CD-ROM drive 109, DoorLock to lock or unlock the door of the CD-ROM drive 109, CD_PlayFromTrackNum to play a track indicated by the audio track number, CD_PauseResume to pause or resume audio CD playing, CD_StopPlay to play an audio CD or stop audio CD playing, CD_GetCurrentPosition to detect the current position for the CD in the CD-ROM drive 109, and CD_GetCDTrackInfo to fetch the track information for a CD. This list of APIs is illustrative and not exhaustive. The audio CD module 726 can be used in connection with a combined digital audio/CD audio mode as described above in connection with FIG. 6.

In a disclosed embodiment, the MP3 player 700 runs in a version of real mode in which all segments have 4-GB limits. This particular mode is commonly referred to as big real mode or flat real mode. This mode can be generated by entering protected mode, setting all of the segment limits to 4-GB and then returning to real mode. It should be understood that the described software components of the MP3 player 700 are illustrative and not exhaustive and that certain described software components can be omitted. It should further be understood that the MP3 player architecture disclosed in FIG. 7 can readily be adapted to support a digital video disc (DVD) player, a digital audio player for an audio format other than MP3 or any other digital data player to play digital data files in a portable computer system independently of an operating system.

The foregoing disclosure and description of various embodiments are illustrative and explanatory thereof and various changes in the data storage media, digital data formats, digital data types, decoding schemes, power states, APIs, software or firmware modules, initialization procedures, code storage schemes, display techniques, file loading techniques, control buttons, file storage schemes, operating system, interrupt techniques and the like, as well as in the details of the illustrated hardware and software and construction and method of operation may be made without departing from the spirit of the invention.

What is claimed is:

1. A portable computer system with an operating system-independent digital data mode, the system comprising:
    an operating system;
    a data storage medium to store a plurality of digitally encoded data files; and
    a digital data player to retrieve the plurality of digitally encoded data files from the data storage medium and to decode and play the plurality of digitally encoded data files in a digital data mode of the portable computer system independent of the operating system,
    wherein the digitally encoded data files are encoded with an audio or video codec.

2. The portable computer system of claim 1, further comprising
    a digital data mode button to place the portable computer system in the digital data mode independent of the operating system; and
    a plurality of digital data control buttons to select a plurality of digital data control commands for the plurality of digitally encoded data files in the digital data mode independent of the operating system.

3. The portable computer system of claim 2, wherein the digital data player detects selection of the plurality of digital data control commands.

4. The portable computer system of claim 2, farther comprising:
    a controller to detect selection of the plurality of digital data control commands and to provide the plurality of digital data control commands to the digital data player in the digital data mode independent of the operating system.

5. The portable computer system of claim 4, wherein the controller comprises a keyboard controller.

6. The portable computer system of claim 1, wherein the digital data player comprises a digital data loader module to load a digital data decoder on the data storage medium.

7. The portable computer system of claim 1, wherein the digital data player comprises a file system module in BIOS to access the plurality of digitally encoded data flies from the data storage medium.

8. The portable computer system of claim 1, wherein the digital data player comprises a digital signal processor.

9. The portable computer system of claim 1, wherein the digital data player comprises a dedicated digital data player chip.

10. The portable computer system of claim 1, wherein the digital data player comprises a digital audio player.

11. The portable computer system of claim 1, wherein the digital data player comprises a digital video player.

12. The portable computer system of claim 1, further comprising:
    a host processor in a reduced power mode in the digital data mode independent of the operating system.

13. The portable computer system of claim 1, wherein selective portions of the portable computer system are placed in a reduced power state in the digital data mode.

14. The portable computer system of claim 1, further comprising:
    a mini-display panel to display control status information associated with playing of the plurality of digitally encoded data files in the digital data mode independent of the operating system.

15. The portable computer system of claim 1, wherein the data storage medium comprises a hard disk drive.

16. The portable computer system of claim 1, wherein the data storage medium comprises a CD-ROM drive.

17. The portable computer system of claim 1, wherein the data storage medium comprises a DVD drive.

18. The portable computer system of claim 1, wherein the data storage medium comprises removable data storage.

19. A digital data player for an operating system-independent digital data mode of a portable computer system, the player comprising:
 a means for retrieving a plurality of digitally encoded audio or video media files from a hard disk drive of a portable computer system in an operating system-independent digital data mode; and
 a means for decoding and playing the plurality of digitally encoded data audio or video media files in the operating system-independent digital data mode.

20. The digital data player of claim 19, further comprising:
 a means for detecting selection of a plurality of digital data control commands associated with playing of the plurality of digitally encoded data files.

21. The digital data player of claim 19, further comprising:
 a means for signaling a mini-display panel of the portable computer system to display control status information associated with playing of the plurality of digitally encoded data files in the operating system-independent digital data mode.

22. The digital data player of claim 19, the means for decoding and playing comprising:
 a file storage means for accessing the plurality of digitally encoded data files from a hard disk drive of the portable computer system in the operating system independent digital data mode.

23. The digital data player of claim 19, further comprising:
 a means for placing selective portions of the portable computer system in a reduced power state in the operating system-independent digital data mode.

24. A method of digital data playing in a digital data mode of a portable computer system independent of an operating system, the method comprising the steps of:
 retrieving a plurality of digitally encoded data files from a data storage medium of a portable computer system in an operating system-independent digital data mode;
 decoding the plurality of digitally encoded data files in the operating system-independent digital data mode; and
 playing the plurality of digitally encoded data files in the operating system-independent digital data mode,
 wherein the digitally encoded data files are encoded with an audio or video codec.

25. The method of claim 24, further comprising the step of:
 detecting selection of a plurality of digital data control commands associated with playing of the plurality of digitally encoded data files in the operating system-independent digital data mode.

26. The method of claim 24, further comprising the step of:
 signaling a mini-display panel of the portable computer system to display control status information associated with playing of the plurality of digitally encoded data files in the operating system-independent digital data mode.

27. The method of claim 24, further comprising the step of:
 placing selective portions of the portable computer system In a reduced power state in the operating system-independent digital data mode.

28. The method of claim 24, wherein the digitally encoded data files comprises digital audio files.

29. The method of claim 24, wherein the digitally encoded data files comprise digital video files.

30. The method of claim 24, wherein the data storage medium comprises a hard disk drive.

31. The method of claim 24, wherein the data storage medium comprises a CD-ROM drive.

32. The method of claim 24, wherein the data storage medium comprises a DVD drive.

33. The method of claim 24, wherein the data storage medium comprises removable data storage.

34. A digital data media player for an operating system-independent digital data mode of a portable computer system, the player comprising:
 a file system module to retrieve a plurality of digitally encoded media files from a hard disk drive of a portable computer system in an operating system-independent digital data mode;
 a digital data decoder to decode and play the plurality of digitally encoded media files in the operating system-independent digital data mode; and
 a digital data loader to load the digital data decoder from the hard disk drive,
 wherein the digitally encoded media files are encoded with an audio or video codec.

35. The digital data player of claim 34, further comprising:
 an interrupt handler to detect selection of a plurality of digital data control commands associated with playing of the plurality of digitally encoded data files in the operating system-independent digital data mode.

36. The digital data player of claim 34, wherein the digital data loader initializes selective portions of the portable computer system for the operating system-independent digital data mode.

37. The digital data player of claim 34, wherein the digital data loader and the file system module are stored In system BIOS of the portable computer system.

38. The digital data player of claim 34, the file system module comprising:
 a hard disk drive driver to read the plurality of digitally encoded data files from the hard disk drive.

39. A portable computer system with an operating system-independent digital audio/audio CD mode, the system comprising:
 an operating system;
 a CD-ROM drive;
 a digital audio/audio CD mode button to place the portable computing system In an operating system-independent digital audio/audio CD mode;
 a means for detecting if the CD-ROM drive contains an audio CD in the operating system-independent digital audio/audio CD mode;
 a means for playing the audio CD in the operating system-independent digital audio/audio CD mode if the CD-ROM drive contains an audio CD; and
 a means for decoding and playing digital audio fifes in the operating system-independent digital audio/audio CD mode if the CD-ROM drive does not contain an audio CD.

40. The portable computer system of claim 39, the means for decoding and playing comprising:
 a means for decoding and playing digital audio files on a hard disk drive of the portable computer system in the operating system-independent digital audio/audio CD mode.

41. The portable computer system of claim 39, the means for decoding and playing comprising:

a means for decoding and playing digital audio files on a data CD in the CD-ROM drive in the operating system-independent digital audio/audio CD mode.

42. A method of audio playing in an operating system-independent digital audio/audio CD mode of a portable computer system, the method comprising the steps of:

detecting If a CD-ROM drive of the portable computer system contains an audio CD in the operating system-independent digital audio/audio CD mode;

playing the audio CD in the operating system-independent digital audio/audio CD mode if the CD-ROM drive contains an audio CD; and decoding and playing digital audio files in the operating system-independent digital audio/audio CD mode if the CD-ROM drive does not contain an audio CD.

43. The method of claim 42, the decoding and playing step comprising the step of:

decoding and playing digital audio files on a hard disk drive of the portable computer system in the operating system-independent digital audio/audio CD mode.

44. The method of claim 42, the decoding and playing step comprising the step of:

decoding and playing digital audio files on a data CD in the CD-ROM drive in the operating system-independent digital audio/audio CD mode.

* * * * *